(12) United States Patent
Stewart et al.

(10) Patent No.: US 10,716,652 B2
(45) Date of Patent: Jul. 21, 2020

(54) MOUTHPIECE FOR TEETH WHITENING

(71) Applicant: SmileDirectClub LLC, Nashville, TN (US)

(72) Inventors: Russ Stewart, Nashville, TN (US); Jan Lombardo, Nashville, TN (US)

(73) Assignee: SDU U.S. SmilePay SPV, Nashville, TN (US)

( * ) Notice: Subject to any disclaimer, the term of this patent is extended or adjusted under 35 U.S.C. 154(b) by 0 days.

(21) Appl. No.: 16/100,449

(22) Filed: Aug. 10, 2018

(65) Prior Publication Data

US 2020/0046478 A1 Feb. 13, 2020

(51) Int. Cl.
*A61C 19/06* (2006.01)
*A61C 5/90* (2017.01)

(52) U.S. Cl.
CPC .............. *A61C 19/066* (2013.01); *A61C 5/90* (2017.02)

(58) Field of Classification Search
CPC ....... A61C 19/066; A61C 5/90; A61C 19/063; A61N 5/00; A63B 71/085
See application file for complete search history.

(56) References Cited

U.S. PATENT DOCUMENTS

| | | | |
|---|---|---|---|
| 5,316,473 A * | 5/1994 | Hare | A61C 19/004 433/215 |
| 6,077,073 A * | 6/2000 | Jacob | A61C 19/066 433/29 |
| 6,083,218 A | 7/2000 | Chou | |
| 6,343,933 B1 | 2/2002 | Montgomery et al. | |
| 6,471,716 B1 | 10/2002 | Pecukonis | |
| 6,499,995 B1 | 12/2002 | Schwartz | |
| 6,514,075 B1 * | 2/2003 | Jacob | A61C 1/088 433/29 |
| 6,616,447 B1 | 9/2003 | Rizoiu et al. | |
| 6,733,290 B2 | 5/2004 | West et al. | |
| 6,783,363 B2 | 8/2004 | Eguchi et al. | |
| 6,886,567 B1 | 5/2005 | Liu | |
| 6,976,841 B1 * | 12/2005 | Osterwalder | A61C 9/0006 433/29 |
| 7,114,953 B1 | 10/2006 | Wagner | |

(Continued)

OTHER PUBLICATIONS

International Search Report and Written Opinion for International Application No. PCT/US2019/044602, dated Oct. 7, 2019, 13 pages.

*Primary Examiner* — Nicholas D Lucchesi
(74) *Attorney, Agent, or Firm* — Foley & Lardner LLP

(57) ABSTRACT

The mouthpiece includes an arch-shaped guard having an inner surface. The inner surface is contoured to follow a shape of a dentition. The arch-shaped guard is sized to span at least a portion of upper teeth and a portion of lower teeth in the dentition. The mouthpiece includes a bite plate positioned along the inner surface and dividing the arch-shaped guard into an upper and lower portion. The mouthpiece includes a first light array arranged along the lower portion of the arch-shaped guard, and a second light array arranged along the upper portion of the arch-shaped guard. The first and second light arrays are arranged at offset distances from the bite plate where the offset distance of the second light array is greater than the offset distance of the first light array. The first and second light arrays are arranged to direct light onto the upper and lower teeth, respectively.

20 Claims, 7 Drawing Sheets

(56) References Cited

U.S. PATENT DOCUMENTS

| | | | |
|---|---|---|---|
| 7,144,249 B2 | 12/2006 | Rizoiu et al. | |
| 7,331,784 B2 | 2/2008 | Suzuki | |
| 7,384,419 B2 | 6/2008 | Jones et al. | |
| 7,572,124 B2* | 8/2009 | Cipolla | A61C 19/004 |
| | | | 433/29 |
| 7,972,024 B2 | 7/2011 | Deleeuw | |
| 7,997,898 B2 | 8/2011 | Ortiz et al. | |
| 7,998,136 B2 | 8/2011 | Jones et al. | |
| 8,029,278 B1* | 10/2011 | Levine | A61C 19/066 |
| | | | 433/215 |
| 8,215,954 B2 | 7/2012 | Levine | |
| 8,371,853 B2* | 2/2013 | Levine | A61C 19/063 |
| | | | 433/215 |
| 8,591,227 B2* | 11/2013 | Levine | A61C 19/063 |
| | | | 433/215 |
| 8,940,033 B2 | 1/2015 | Dwyer et al. | |
| D765,255 S | 8/2016 | Levine | |
| 9,492,257 B2 | 11/2016 | Jablow et al. | |
| 9,572,645 B2 | 2/2017 | Levine et al. | |
| 9,622,841 B2 | 4/2017 | Ajiki et al. | |
| 9,636,198 B2 | 5/2017 | Kodama | |
| 9,730,780 B2 | 8/2017 | Brawn et al. | |
| 9,839,500 B2 | 12/2017 | Flyash et al. | |
| 9,889,315 B2 | 2/2018 | Demarest et al. | |
| 9,901,744 B2 | 2/2018 | Demarest et al. | |
| 9,913,992 B2 | 3/2018 | Demarest et al. | |
| 9,974,630 B2 | 5/2018 | Heacock et al. | |
| 2005/0202363 A1 | 9/2005 | Osterwalder | |
| 2005/0266370 A1 | 12/2005 | Suzuki | |
| 2006/0019214 A1 | 1/2006 | Lawrence et al. | |
| 2006/0110700 A1 | 5/2006 | Cipolla et al. | |
| 2006/0134576 A1 | 6/2006 | West | |
| 2006/0200212 A1 | 9/2006 | Brawn | |
| 2007/0003905 A1 | 1/2007 | Nguyen et al. | |
| 2007/0037114 A1 | 2/2007 | Wang | |
| 2007/0054233 A1 | 3/2007 | Rizoiu et al. | |
| 2007/0054235 A1 | 3/2007 | Rizoui et al. | |
| 2007/0054236 A1 | 3/2007 | Rizoiu et al. | |
| 2007/0059660 A1 | 3/2007 | Rizoiu et al. | |
| 2007/0248930 A1 | 10/2007 | Brawn | |
| 2008/0044796 A1 | 2/2008 | Hsu | |
| 2008/0063999 A1 | 3/2008 | Osborn | |
| 2008/0113313 A1 | 5/2008 | Khouri | |
| 2008/0233541 A1* | 9/2008 | De Vreese | A61C 19/003 |
| | | | 433/216 |
| 2010/0151407 A1 | 6/2010 | Rizoiu et al. | |
| 2010/0305668 A1 | 12/2010 | Brawn | |
| 2011/0076636 A1* | 3/2011 | Wolff | A61C 19/063 |
| | | | 433/27 |
| 2011/0091835 A1* | 4/2011 | Levine | A61C 19/063 |
| | | | 433/29 |
| 2011/0189626 A1 | 8/2011 | Sanzari | |
| 2012/0045729 A1 | 2/2012 | Ortiz et al. | |
| 2013/0045457 A1* | 2/2013 | Chetiar | A61N 5/0601 |
| | | | 433/29 |
| 2013/0280671 A1* | 10/2013 | Brawn | A61N 5/0603 |
| | | | 433/24 |
| 2014/0121731 A1 | 5/2014 | Brawn | |
| 2014/0242535 A1* | 8/2014 | Lowe | A61C 19/063 |
| | | | 433/18 |
| 2015/0064645 A1* | 3/2015 | Jablow | A61C 19/066 |
| | | | 433/29 |
| 2015/0132709 A1 | 5/2015 | Park et al. | |
| 2016/0271415 A1 | 9/2016 | Min | |
| 2016/0331487 A1 | 11/2016 | Newman et al. | |
| 2017/0079746 A1 | 3/2017 | Sanders | |
| 2017/0080249 A1 | 3/2017 | Brawn et al. | |
| 2017/0119512 A1 | 5/2017 | Westlake et al. | |
| 2017/0120069 A1 | 5/2017 | Johansson et al. | |
| 2017/0173353 A1 | 6/2017 | Demarest et al. | |
| 2017/0173354 A1 | 6/2017 | Demarest et al. | |
| 2017/0173356 A1 | 6/2017 | Demarest et al. | |
| 2017/0173357 A1 | 6/2017 | Demarest et al. | |
| 2017/0173358 A1 | 6/2017 | Demarest et al. | |
| 2017/0197089 A1* | 7/2017 | Newman | A61N 5/0603 |
| 2017/0197090 A1* | 7/2017 | Newman | A61N 5/0603 |
| 2017/0224455 A1 | 8/2017 | Levine et al. | |
| 2018/0014924 A1 | 1/2018 | Brawn et al. | |
| 2018/0125627 A1 | 5/2018 | Mounce | |
| 2018/0243581 A1* | 8/2018 | Newman | A61N 5/0603 |

* cited by examiner

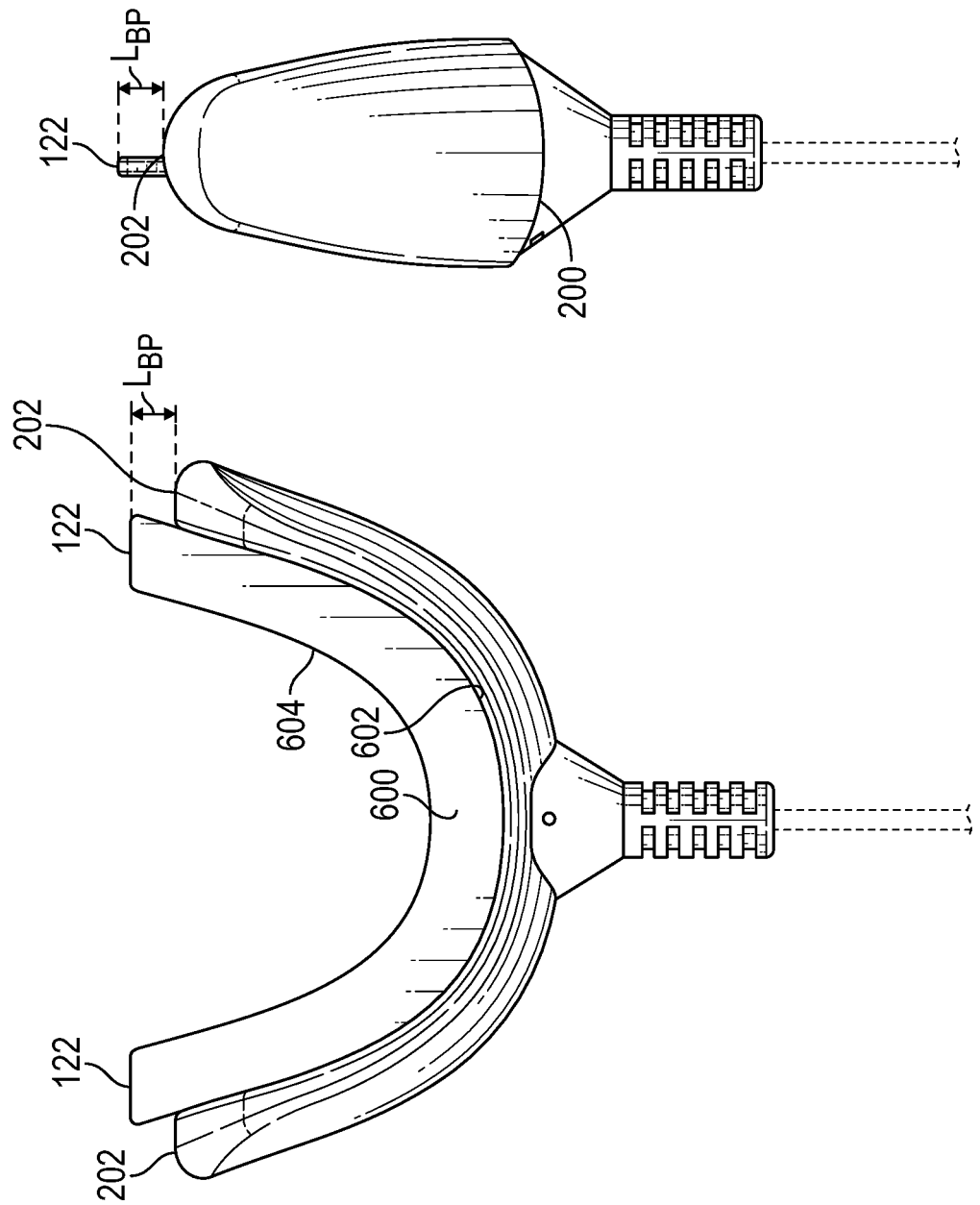

MOUTHPIECE FOR TEETH WHITENING

BACKGROUND

The present disclosure relates generally to teeth whitening, and more specifically to mouthpieces for teeth whitening.

Various types of teeth whitening treatments exist, including kits and procedures that can be carried out by a user in their own home or in the office of a dental professional. Some teeth whitening kits include trays that a whitening gel is administered to before the trays are positioned in the user's mouth for a duration of time. Some teeth whitening kits include strips that are positioned onto and around the user's teeth for a duration of time. Some teeth whitening procedures include the use of teeth whitening lights located on a teeth whitening apparatus inserted into a user's mouth. However, teeth whitening lights typically direct light on only a limited number of teeth and at undesirable angles and positions, which results in some teeth not being sufficiently whitened leading to inconsistent results. For instance, teeth whitening light mouthpieces do not accommodate for the different dimensional size of the upper teeth with respect to the lower teeth. Additionally, a whitening light mouthpiece may be uncomfortable when positioned in a user' mouth due to the dimensions of the mouthpiece and how it fits in the mouth of the user and accommodates their teeth.

SUMMARY

One embodiment relates to a mouthpiece for teeth whitening. The mouthpiece includes an arch-shaped guard having an outer surface and an inner surface. The inner surface is contoured to follow a shape of a dentition. The arch-shaped guard is sized to span at least a portion of upper teeth and a portion of lower teeth in the dentition. The mouthpiece includes a bite plate positioned along the inner surface and extending substantially perpendicularly therefrom. The bite plate divides the arch-shaped guard into an upper portion and a lower portion. The mouthpiece includes a first light array arranged along the lower portion of the arch-shaped guard. The first light array includes a plurality of lights configured to direct light onto a plurality of the lower teeth. The first light array is arranged a first offset distance from the bite plate. The mouthpiece includes a second light array arranged along the upper portion of the arch-shaped guard. The second light array includes a plurality of lights configured to direct light onto a plurality of the upper teeth. The second light array is arranged a second offset distance from the bite plate. The second offset distance is greater than the first offset distance.

Another embodiment relates to a mouthpiece for teeth whitening. The mouthpiece includes an arch-shaped guard having an outer surface and an inner surface. The inner surface is contoured to follow a shape of a dentition. The arch-shaped guard is sized to span at least a portion of upper teeth and a portion of lower teeth in the dentition. The mouthpiece includes a bite plate positioned along the inner surface and extending substantially perpendicularly therefrom. The bite plate divides the arch-shaped guard into an upper portion and a lower portion. The bite plate has an outer profile which follows the contour of the inner surface of the arch-shaped guard. The bite plate includes an inner profile. A distance between the inner profile and outer profile increases towards an end of the bite plate. The mouthpiece includes a first light array arranged along the lower portion of the arch shaped guard for directing light onto a plurality of lower teeth. The first light array is arranged a distance from the bite plate corresponding to a length of the plurality of lower teeth. The mouthpiece includes a second light array arranged along the upper portion of the arch-shaped guard for directing light onto a plurality of upper teeth. The second light array is arranged a distance from the bite plate corresponding to a length of the plurality of upper teeth.

Another embodiment relates to a mouthpiece for teeth whitening. The mouthpiece includes an arch-shaped guard having an outer surface and an inner surface. The inner surface is contoured to follow a shape of a dentition. The arch-shaped guard is sized to span at least a portion of upper teeth and a portion of lower teeth in the dentition. The mouthpiece includes a bite plate positioned along the inner surface and extending substantially perpendicularly therefrom. The bite plate divides the arch-shaped guard into an upper portion and a lower portion. The bite plate has an outer profile that follows the contour of the inner surface of the arch-shaped guard. The mouthpiece includes a first light array arranged along the lower portion of the arch-shaped guard for directing light onto a plurality of lower teeth. Each light in the first light array is arranged a distance from the bite plate corresponding to an average length of the plurality of lower teeth. The mouthpiece includes a second light array arranged along the upper portion of the arch-shaped guard for directing light onto a plurality of upper teeth. Each light in the second light array is arranged a distance from the bite plate corresponding to an average length of the plurality of upper teeth.

BRIEF DESCRIPTION OF THE DRAWINGS

FIG. 6 is a top view of a mouthpiece for teeth whitening, according to another exemplary embodiment.

FIG. 7 is a side view of the mouthpiece of FIG. 6, according to an exemplary embodiment.

DETAILED DESCRIPTION

Figure 2:
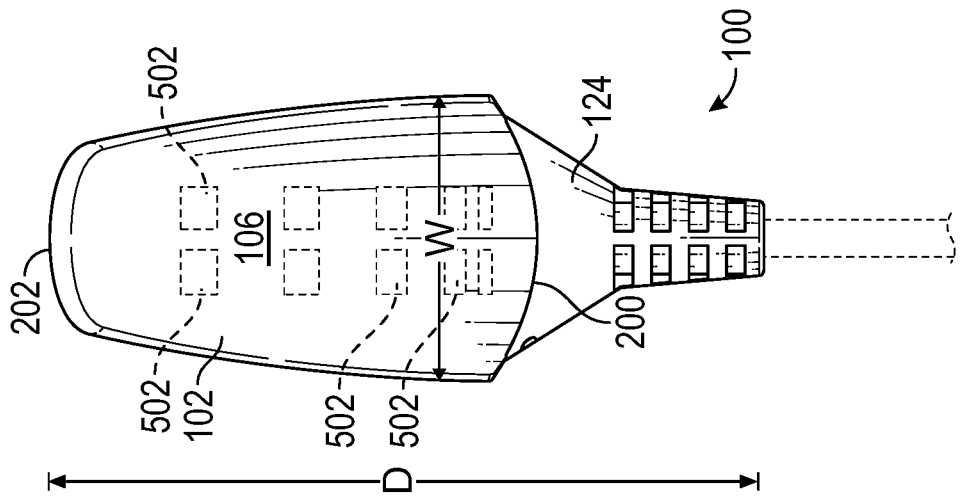
FIG. 2 is a side view of the mouthpiece of FIG. 1, according to an exemplary embodiment.
Figure 1:
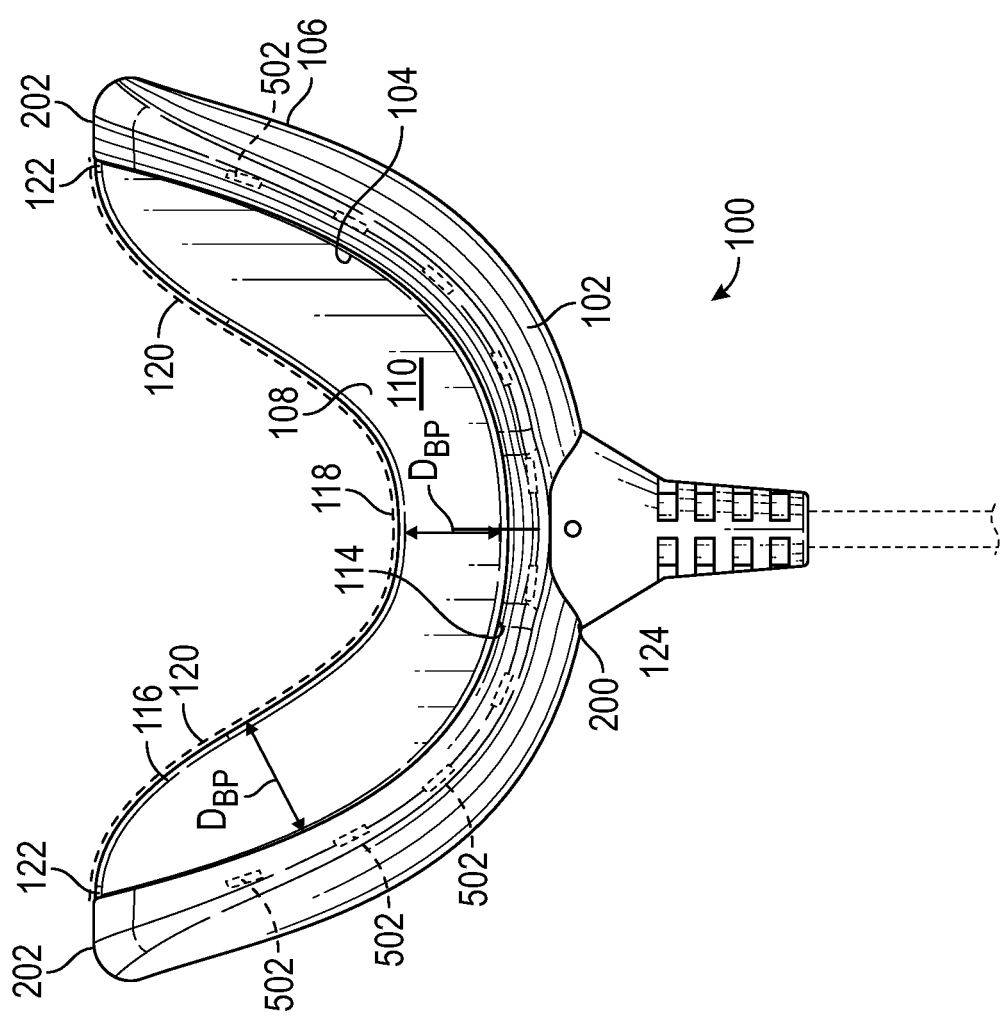
FIG. 1 is a top view of a mouthpiece for teeth whitening, according to an exemplary embodiment.

Referring generally to the figures, a mouthpiece for teeth whitening is disclosed. The mouthpiece is configured for either in-home use, thus eliminating the need to visit a dental professional for a whitening treatment, or for administration to a user by a dental professional. The mouthpiece includes an arch-shaped guard having an inner and outer surface. The inner surface is contoured to follow a shape of a dentition. The arch-shaped guard is sized to span at least a portion of upper teeth and a portion of lower teeth in the dentition. The mouthpiece includes a bite plate positioned along the inner surface and extending substantially perpendicularly therefrom. The bite plate divides the arch-shaped guard into an upper portion for whitening the upper teeth of the user and a lower portion for whitening the lower teeth of the user. The bite plate has an outer profile that follows the contour of the inner surface of the arch-shaped guard. The mouthpiece includes a first light array arranged along the upper portion of the arch-shaped guard, and a second light array arranged along the lower portion of the arch-shaped guard. The first light array and second light array are each arranged in the upper and lower extensions. Accordingly, each of the upper and lower extensions include a respective light array that is arranged to direct light onto a plurality of upper and lower teeth, respectively.

The mouthpiece described herein includes many improvements and advantages over current teeth whitening light systems. For instance, in some embodiments, the light array for the upper and/or lower portions may each include at least ten lights (for a total of twenty lights between both the upper and lower portions) that direct light on at least ten teeth in both the upper and lower jaw of the user. These embodiments expand the number of teeth which are whitened, which may increase user satisfaction.

In some embodiments, lights from the respective light array are arranged different distances from the biteplate based on whether the lights are located on the upper portion of the mouthpiece or the lower portion of the mouthpiece. For example, the distance that the light arrays are arranged from the bite plate can correspond to an average length of the plurality of upper and lower teeth, respectively, such that more light from the light array is distributed to the upper teeth than to the lower teeth, instead of arranging the bite plate in the middle of the light array to equally distribute light from the light array among both the upper teeth and the lower teeth. In these embodiments, light may be directed towards a center of the upper and lower teeth, which may increase the speed and/or consistency of the teeth whitening process and provide better light coverage of the upper teeth, which are typically longer than the lower teeth of a user and therefore have a greater surface area to whiten.

In some embodiments, the bite plate may include an inner profile. A distance between the inner and outer profile may progressively change. For instance, the distance between the inner and outer profile may increase towards an end of the bite plate (e.g., toward an area of the bite plate near a molar of the user). In these embodiments, the bite plate may provide an increased bite surface area. As a result, the user may rely on one or more molar on both the left and right sides of the bite plate and on both the top and bottom of the bite plate to hold the mouthpiece in place, and where whitening gel is administered with the whitening light, gel adherence may also be increased. As such, proper positioning of the mouthpiece within the user's mouth is more likely to be achieved due to the increased bite surface area.

Various other improvements and benefits will become apparent through the subsequent description of the figures.

Referring now to FIG. 1-FIG. 4, various views of a mouthpiece 100 for teeth whitening are shown, according to an exemplary embodiment. The mouthpiece 100 may be sized to fit into a user's mouth. For example, the mouthpiece 100 can be sized for an individual user having a mouth or dentition of a certain size, or mouthpieces 100 of various sizes can be provided such that a particular sized mouthpiece can be selected for a user based on their mouth or dentition size. The mouthpiece 100 can be manufactured such that it is sized to fit all or most users. For instance, the mouthpiece 100 may be manufactured based on consumer data corresponding to impressions of several users (e.g., impressions taken by fifty or more people). In some embodiments, the consumer data is based on dental impressions of consumers receiving a dental treatment or a diagnosis of eligibility for participating in a dental treatment, such as a treatment for aligning one or more teeth of the user (e.g., a dental alignment treatment including the use of dental aligners worn by the user). The mouthpiece 100 may be designed, constructed, manufactured, or otherwise generated based on the impressions of the consumer data. The mouthpiece 100 may have a shape to fit a generic dentition layout which is identified, determined, or otherwise generated based on the impressions of the consumer data. Hence, the mouthpiece 100 may generally have a generic shape sized to fit all users, most users, or an average user. In some embodiments, the mouthpiece 100 may be sized to fit a particular user (e.g., mouthpiece 100 is manufactured based on dental impressions of the particular user). For instance, a user may take an impression of their upper and lower dentitions (e.g., at a dental office, using a home impression kit, etc.), and the mouthpiece 100 may be created, manufactured, or otherwise generated based on the impressions of the user's upper and lower dentitions. Hence, the mouthpiece 100 may be customized for a particular user.

In use, the mouthpiece 100 is positioned in a user's mouth. In some embodiments, whitening gel may be administered on the mouthpiece 100 prior to the mouthpiece 100 being positioned in the user's mouth. The mouthpiece 100 includes lights which direct light on individual teeth to whiten the teeth. The mouthpiece 100 is maintained in the user's mouth for a predetermined treatment time. Following a number of treatments, the user's teeth may become noticeably whiter.

The mouthpiece 100 includes a guard 102 which is shown to be generally arch-shaped, according to an exemplary embodiment. The arch-shaped guard 102 includes an inner surface 104 and an outer surface 106. The inner surface 104 is contoured to follow a shape of a dentition. Accordingly, when the mouthpiece 100 is placed in a user's mouth, the inner surface 104 may generally follow the shape of the user's teeth. Note that the contour for the inner surface 104 may be generic to follow a general shape of a dentition. The guard 102 may be sized to fit comfortably in a user's mouth. The guard 102 may span at least a portion of upper and lower teeth in the dentition. Additionally, the guard 102 may have a thickness $T_G$. In some embodiments, the thickness $T_G$ of the guard 102 may be between 3.25 and 3.50 mm. In some embodiments, the thickness $T_G$ of the guard 102 may be approximately 3.36 mm.

The guard 102 may be formed of a translucent or transparent material. In some embodiments, the guard 102 may be formed of several materials which are joined together. For instance, various layers of the guard 102 may be translucent or transparent, while other layers may be opaque. The guard 102 is shown (in phantom) to include various lights 502 of a light array 500, shown in FIG. 5. The lights 502 may be embedded in the guard 102, or may be arranged along the inner surface 104 of the guard 102. The lights 502 may be arranged to direct light onto the upper and lower teeth of the user, as will be discussed in greater detail below with reference to FIG. 5.

The mouthpiece 100 is shown to include a bite plate 108. In some embodiments, the bite plate 108 and the guard 102 may be integrally formed. In other embodiments, the bite plate 108 may be attached (e.g., adhesively attached, attached with heat) to the guard 102. The bite plate 108 is positioned along the inner surface 104 of the guard 102. The bite plate 108 may be constructed of a foam or rubber-like material. The bite plate 108 may be flexible such that a user can comfortably bite down on the bite plate 108. The bite plate 108 may include an upper surface 110 and a lower surface 112. The upper surface 110 may be the surface which contacts the user's upper (maxillary) teeth in use. The lower surface 112 may be the surface which contacts the user's lower (mandibular) teeth in use. The bite plate 108 may have a thickness $T_B$. In some embodiments, the thickness $T_B$ may be within 1.00 mm and 5.00 mm. For instance, the thickness $T_B$ may be 2.00 mm.

In some embodiments, the bite plate 108 and guard 102 may be formed of a substantially impermeable material. For instance, the bite plate 108 and guard 102 may be formed of a material that is resistant to absorbing or unlikely to be broken down by saliva, water, whitening gel, or other fluids which may contact the bite plate 108 and/or guard 102.

The bite plate 108 is shown to include an outer profile 114 and an inner profile 116. The outer profile 114 may follow the contour of the inner surface 104 of the guard 102. In some embodiments, the outer profile 114 of the bite plate 108 may substantially match the contour of the inner surface 104. Accordingly, where the inner surface 104 is contoured to have an arch, the outer profile 114 may also have an arch. In some embodiments, the inner profile 116 may also be arched. In the embodiment shown in FIG. 1-FIG. 4, the inner profile 116 may be arched in a center portion 118 of the bite plate 108 (e.g., where the incisors would be located in use). Additionally, the inner profile 116 may taper off towards end portions 120 of the bite plate 108 (e.g., where bicuspids and molars would be located in use). According to this embodiment, the inner profile 116 may generally have a bell curve shape.

In some embodiments, a distance $D_{BP}$ between the inner profile 116 and outer profile 114 may change. For instance, the distance $D_{BP}$ between the inner profile 116 and outer profile 114 may progressively increase from the center portion 118 of the bite plate 108 towards the end portions 120 of the bite plate 108. In this regard, the distance $D_{BP}$ may increase towards the ends 122 of the bite plate 108. Additionally, the distance $D_{BP}$ may decrease in the end portions 120 at the ends 122. Accordingly, the distance $D_{BP}$ may progressively increase from the center portion 118 of the bite plate towards the ends 122, and near the ends, the distance $D_{BP}$ may progressively decrease to taper to the ends 122. In these embodiments, a surface area for the bite plate 108 may increase towards the ends 122 of the bite plate 108. As a result, a user may be able to better grip the bite plate 108 with their teeth. The bite plate 108 is shown to extend up to the ends 202 of the guard 102. The bite plate 108 may extend a length which corresponds to a distance between a lateral incisor and a second bicuspid (second pre-molar). In this regard, the bite plate 108 may extend in a user's mouth such that the second bicuspid makes contact with the bite plate 108 in use. In some embodiments, the bite plate 108 may extend a length which corresponds to a distance between a lateral incisor and a first molar (or second molar). Such embodiments may further increase the bite surface area, as will be discussed in greater detail below.

Figure 3:
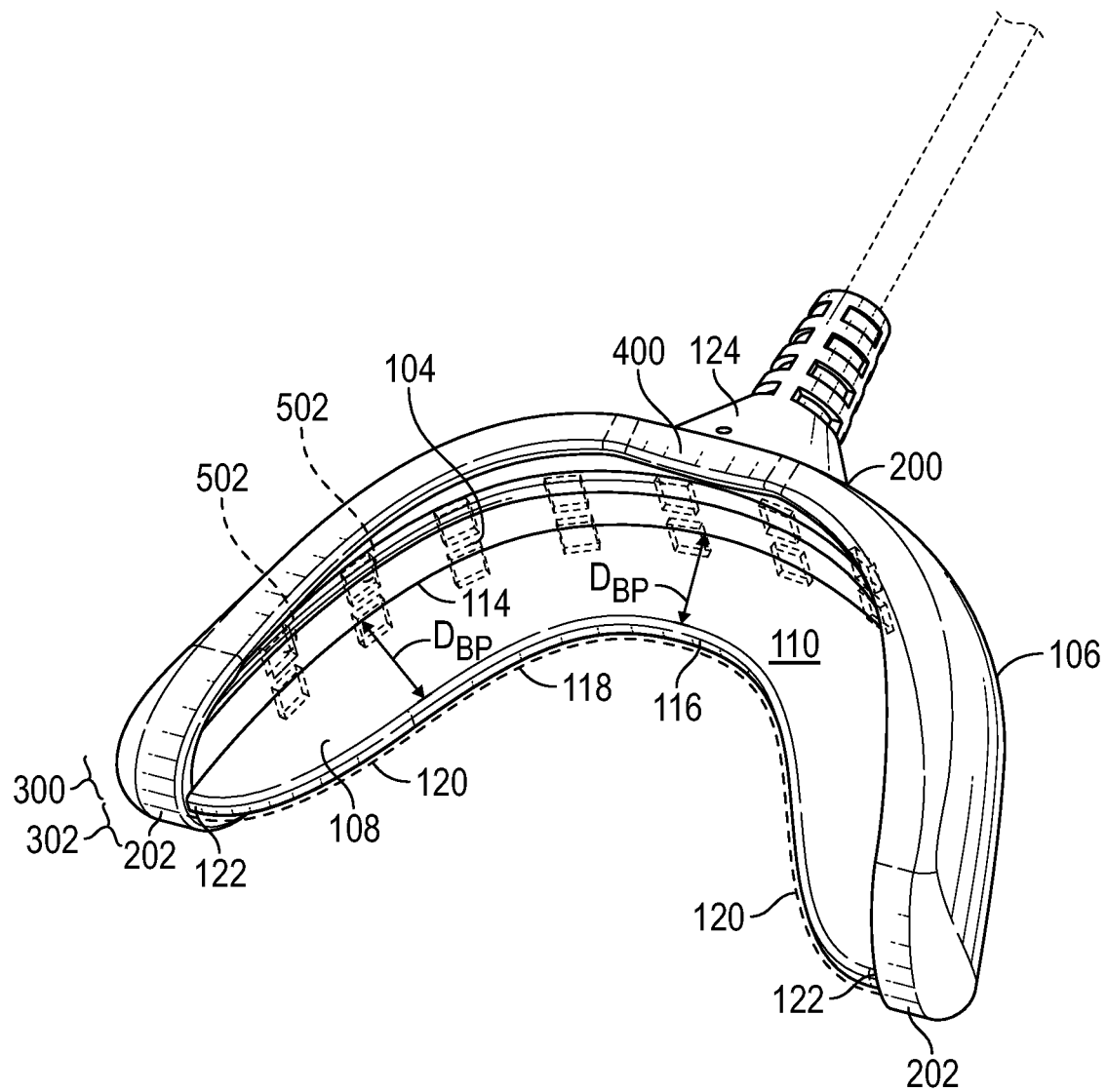
FIG. 3 is a perspective view of the mouthpiece of FIG. 1, according to an exemplary embodiment.
Figure 4:
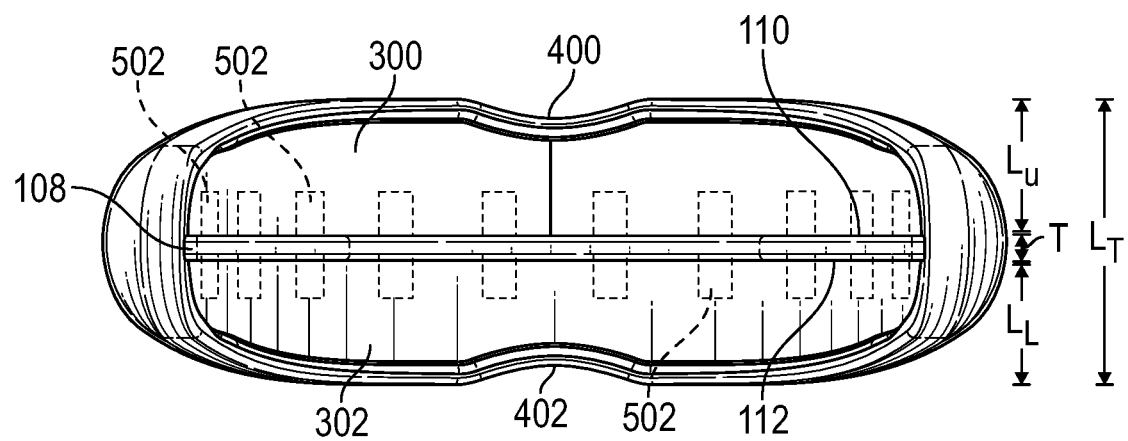
FIG. 4 is a front view of the mouthpiece of FIG. 1, according to an exemplary embodiment.

As can be best seen in FIG. 3 and FIG. 4, the bite plate 108 divides the arch-shaped guard 102 into an upper portion 300 and a lower portion 302. The upper portion 300 may face the upper teeth of the dentition. The lower portion 302 may face the lower teeth of the dentition. The upper portion 300 and lower portion 302 may extend a length $L_U$, $L_L$ from the bite plate 108, respectively. In some embodiments, the length $L_U$ for the upper portion 300 and the length $L_L$ for the lower portion 302 may be substantially the same. In other embodiments, the length $L_U$ for the upper portion 300 may be greater than the length 306 for the lower portion 302. In these embodiments, the length $L_U$ may correspond to an average length of upper teeth of the dentition, and length $L_L$ may correspond to an average length of lower teeth of the dentition. For instance, the upper portion 300 may have a length $L_U$ of between 10.00 mm and 12.00 mm, and the lower portion 302 may have a length $L_L$ of between 9.00 and 11.00 mm. As one non-limiting example, the upper portion 300 may have a length $L_U$ of approximately 11.00 mm and the lower portion 302 may have a length $L_L$ of approximately 10.00 mm. In these embodiments, the upper portion 300 may extend the length of the upper teeth and the lower portion 302 may extend the length of the lower teeth (e.g., at least, the full length of the exposed portion of the central upper and lower incisors).

In some embodiments, the guard 102 may span a length $L_T$ which includes the length $L_U$ of the upper portion 300, thickness T of the bite plate 108, and the length $L_L$ of the lower portion 302. In some embodiments, the guard 102 may span a length $L_T$ of between 20.00 mm and 25.00 mm. In some embodiments, the guard 102 may span a length $L_T$ of approximately 23.00 mm.

As can be best seen in FIG. 2, in some embodiments, a width W of the guard 102 may change from a front end 200 to the back ends 202. For instance, the width W may decrease from the front end 200 to the back ends 202. In this regard, the guard 102 may taper from a front end 200 to the back ends 202 of the guard 102. The guard 102 may taper so as to fit more comfortably in a user's mouth. The width W may be the maximum length $L_L$ (for instance, approximately 23.00 mm) at the front end 200, and the width W may decrease as the guard 102 progresses towards the back end 202.

As can be best seen in FIG. 4, in some embodiments, the guard 102 may have upper and lower detents 400, 402. The upper detent 400 and lower detent 402 may be located towards the front end 200 of the guard 102. The upper detent 400 may accommodate for the maxillary labial frenum of a user. Additionally, the lower detent 402 may accommodate for the mandibular labial frenum of a user. In these embodiments, the upper and lower detent 400, 402 may allow the guard 102 to be comfortably positioned in the user's mouth.

Figure 5:
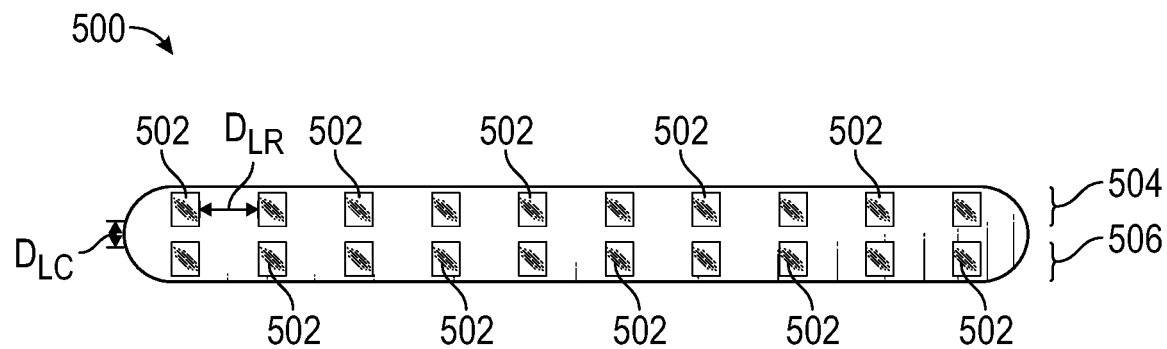
FIG. 5 is a view of a light array for the mouthpiece of FIG. 1, according to an exemplary embodiment.

Referring now to FIG. 1-FIG. 4 and FIG. 5, the guard 102 may include a light array 500. Specifically shown in FIG. 5 is a light array 500 for the mouthpiece 100, according to an exemplary embodiment. The light array 500 is shown to include a plurality of individual lights 502. In some embodiments, the lights 502 may be LEDs. The lights 502 may be structured or configured to output, for instance, ultraviolet light.

The light array 500 is arranged along the inner surface 104 of the guard 102. In some embodiments, the light array 500 may be embedded in the guard 102 with the lights 502 directing light outwardly from the inner surface 104. In other embodiments, the light array 500 may be positioned on the inner surface 104 with the lights 502 facing outwardly from the inner surface 104. In both arrangements, the light array 500 may include a plurality of lights 502 arranged to direct light on a plurality of teeth of the user when in use.

In the embodiment shown in FIG. 5, the light array 500 includes 20 individual lights 502. The light array 500 includes ten upper lights 502, which form an upper light array 504, and ten lower lights 502, which form a lower light array 504. The light array 500 may be positioned along the inner surface 104 such that the lights 502 in the upper light array 504 directs light onto upper teeth, and the lights 502 in the lower light array 506 direct light onto lower teeth. The lights 502 in the upper light array 504 may be arranged along the upper portion 300 of the guard 102, and the lights 502 in the lower light array 506 may be arranged along the lower portion 302 of the guard 102.

The upper light array 504 may be configured to direct light onto each of the maxillary incisors and bicuspids (e.g., pre-molars). The lower light array 506 may be configured to direct light onto each of the mandibular incisors and bicuspids. While 20 individual lights 502 are shown in the embodiment depicted in FIG. 5, the embodiments of the present disclosure are not limited to 20 individual lights and can include more or fewer lights, according to various embodiments and applications.

As shown, the lights 502 are spaced apart from one another. For instance, adjacent lights 502 in the same row (e.g., two lights 502 in the upper light array 504 or lower light array 506) may be separated at a distance $D_{LR}$. The distance $D_{LR}$ may correspond to an average distance between a center of two corresponding adjacent teeth. In some embodiments, the distance $D_{LR}$ may be between 8.00 mm and 10.00 mm. For instance, the distance $D_{LR}$ may be approximately 9.00 mm. Additionally, adjacent lights 502 in the same column (e.g., one light 502 in the upper light array 504 and one light 502 in the lower light array 506) may be separated at a distance $D_{LC}$. The distance $D_{LC}$ may correspond to an average distance between a center of two corresponding upper and lower teeth. In some embodiments, the distance $D_{LC}$ may correspond to the distance between the center of two corresponding upper and lower teeth and the thickness T of the bite plate 108. In this regard, the adjacent lights 502 in the same column may be positioned to direct light substantially at the center of a corresponding tooth. In these embodiments, the lights 502 directing light substantially at the center of a corresponding tooth may expedite and increase the consistency of the whitening process. In some embodiments, the lights 502 are positioned to direct light substantially at the center of a corresponding tooth where the center is determined based on an intended user, a physical characteristic of the intended user, or a demographic of the intended user.

In some embodiments, the lights 502 may be arranged to direct light substantially at the center of a corresponding tooth based on their position with respect to other lights 502 in the light array 500. According to one embodiment, the bite plate 108 may be positioned along the center of the light array 500. In this embodiment, the lights 502 may be located a distance from the bite plate 108 based on an average length of the upper or lower teeth. The average length of the upper or lower teeth may be an average of all upper teeth (or lower teeth), or the average length of the upper or lower teeth may be an average of a subset of the upper teeth (or lower teeth).

In arrangements where the length $L_U$ of the upper portion 300 and length $L_L$ of the lower portion 302 are different, the lights 502 in the upper and lower light arrays 504, 508 may be located at different distances from the bite plate 108. For instance, each of the lights 502 in the upper light array 504 may be located at a first distance from the bite plate 108 which corresponds to half of the length $L_U$ of the upper portion 300. In these embodiments, the lights 502 in the upper light array 504 may be positioned in the center of the upper portion 300. Similarly, each of the lights 502 in the lower light array 506 may be located at a second distance from the bite plate 108 which corresponds to half of the length $L_L$ of the lower portion 302. In these embodiments, the lights 502 in the lower light array 506 may be positioned in the center of the lower portion 302.

In arrangements where the length $L_U$ of the upper portion 300 and length $L_L$ of the lower portion 302 are substantially the same, the lights 502 in the upper and lower light arrays 504, 508 may be located at different distances from the bite plate 108 and not located in the center of their respective upper portion 300 and lower portion 302. For instance, each of the lights 502 in the upper light array 504 may be located at a first distance from the bite plate 108 which corresponds to half of the average length of upper teeth of the dentition, and each of the lights 502 in the lower light array 504 may be located at a second distance from the bite plate 108 which corresponds to half of the average length of lower teeth of the dentition. In these embodiments, the lights 502 in the upper light array 504 may be positioned in the center of the upper portion 300. Similarly, each of the lights 502 in the lower light array 506 may be located at a second distance from the bite plate 108 which corresponds to half of the length $L_L$ of the lower portion 302. In these embodiments, the lights 502 in the lower light array 506 may be positioned in the center of the lower portion 302.

Each of the lights 502 may receive power from an external source. For instance, the mouthpiece 100 may include an adapter 124 which extends from the front end 200 of the guard 102. The adapter 124 may electrically couple the external source to the mouthpiece 100 and each of the individual lights 502. The external source may provide electrical power to each of the lights 502 such that the lights 502 can direct light onto each of the individual corresponding teeth. In some embodiments, the mouthpiece 100 with the adapter 124 may extend a distance D. The distance D may correspond to the distance which the mouthpiece 100 extends into the user's mouth, and the length of the adapter 124. In some embodiments, the distance D may be between 50.00 mm and 60.00 mm. In some embodiments, the distance D may be 57.00 mm. For instance, the adapter 124 may have a length of approximately 18.00 mm, and the mouthpiece 100 may extend in the user's mouth a distance of approximately 39.00 mm. In these embodiments, the mouthpiece 100 may sit comfortably within the user's mouth.

Referring now to FIG. 6-FIG. 10, in some embodiments, various modifications may be made to the bite plate 102. Specifically, FIG. 6-FIG. 10 each show various views of a mouthpiece for teeth whitening, according to exemplary embodiments. The mouthpieces depicted in FIG. 6-FIG. 10 may include many of the same features as those described above with reference to FIG. 1-FIG. 5. Accordingly, these reference numerals will be duplicated for purpose of clarity.

As shown in FIG. 6, in some embodiments, bite plate 600 may have a different shape than bite plate 108. For instance, bite plate 600 may have an inner and outer profile 602, 604 which are substantially the same. In this embodiment, the inner profile 602 and outer profile 604 may both be arched. The inner and outer profile 602, 604 may be arched to substantially match the contour of the inner surface 104 of the guard 102.

In some embodiments, the bite plate 600 may extend past the back ends 202 of the guard 102. For instance, as can be best seen in FIG. 6 and FIG. 7, the bite plate 600 may extend a length $L_{BP}$ past the back ends 202. The ends 122 of the bite plate 600 may extend the length $L_{BP}$ past the back ends 202 of the guard 102. In some embodiments, length $L_{BP}$ may be between 3.00 mm and 7.00 mm. For instance, the length $L_{BP}$ may be 5.00 mm. In these embodiments, the bite plate 600 may be extended to provide an increased bite surface area for a user. Such embodiments may improve adherence of gel on the user's teeth (since the position of the mouthpiece 100 will likely be maintained with an increased bite surface area). Additionally, such embodiments may improve the likelihood of proper positioning of the mouthpiece 100 within the user's mouth based on the increased surface area.

Figure 8:
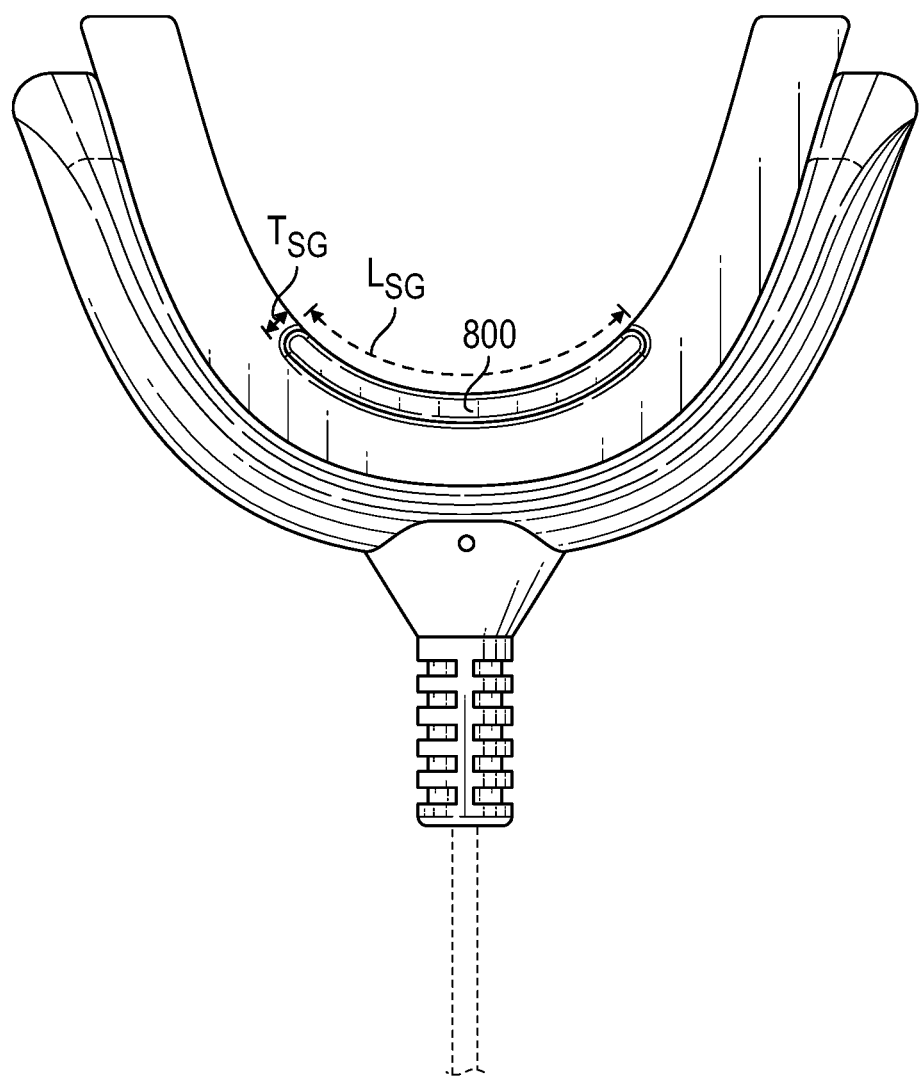
FIG. 8 is a top view of a mouthpiece for teeth whitening, according to another exemplary embodiment.
Figure 9:
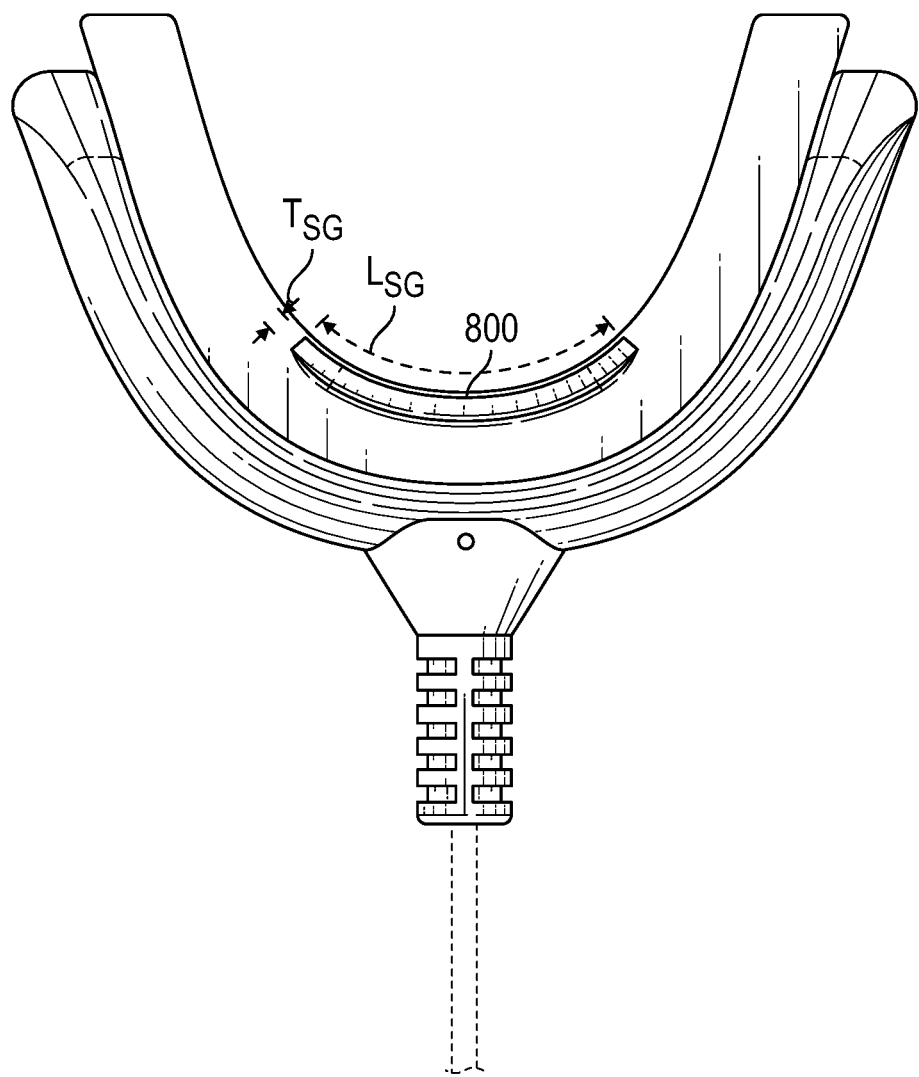
FIG. 9 is a top view of a mouthpiece for teeth whitening, according to another exemplary embodiment.
Figure 10:
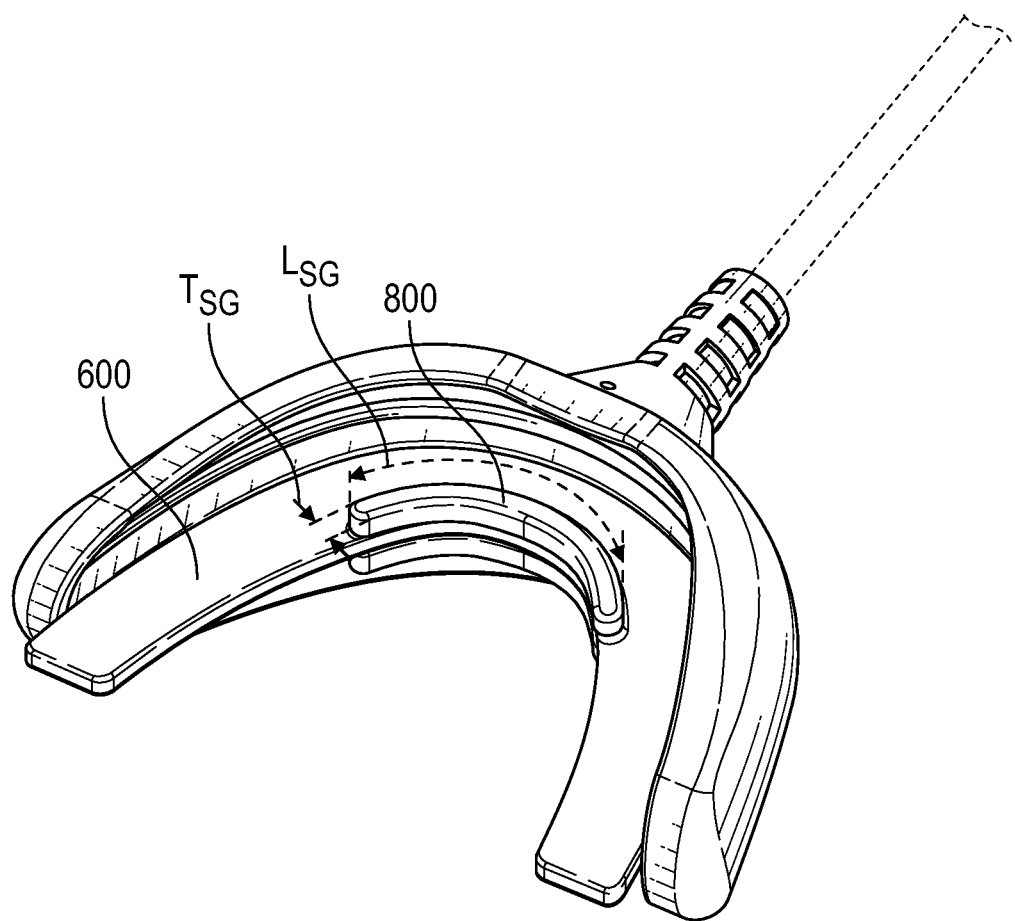
FIG. 10 is a perspective view of a mouthpiece for teeth whitening, according to another exemplary embodiment.

As can be best seen in FIG. 8-FIG. 10, in some embodiments, the bite plate 600 (or bite plate 108) may include a slip guard 800. The slip guard 800 may be located near the center of the bite plate 600. The slip guard 800 may be positioned along a portion of the inner profile 602 of the bite plate 600. The slip guard 800 may be positioned on the upper surface 110 and/or the lower surface 112. In some embodiments, the bite plate 800 may include two slip guards 800 (e.g., upper and lower slip guards 800).

The slip guard 800 may be sized to fit behind a user's teeth when in use. For instance, the slip guard 800 may have a thickness TSG and a length LSG. The thickness TSG may be between 1.00 mm and 4.00 mm. For instance, the thickness TSG may be approximately 2.50 mm. Additionally, the length LSG may extend the length of the central and lateral incisors in a dentition. In some embodiments, the length LSG may extend the length of the central incisors, lateral incisors, and cuspids, for instance. Accordingly, the user positions the mouthpiece 100 in their mouth where their teeth are sandwiched between the slip guard 800 and the inner surface 104 of the guard 102. The slip guard 800 may have flat ends, such as the slip guard 800 depicted in FIG. 8. Additionally, the slip guard 800 may have rounded or beveled ends, such as the slip guard 800 depicted in FIG. 9.

The embodiments described herein have been described with reference to drawings. The drawings illustrate certain details of specific embodiments described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The construction and arrangement of the elements of the mouthpiece 100 as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

The word "exemplary" is used to mean serving as an example, instance, or illustration. Any embodiment or design described herein as "exemplary" or as an "example" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A mouthpiece for teeth whitening comprising:
an arch-shaped guard having an outer surface and an inner surface, the inner surface contoured to follow a shape of a dentition, the arch-shaped guard sized to span at least a portion of upper teeth and a portion of lower teeth in the dentition;
a bite plate positioned along the inner surface and extending substantially perpendicularly therefrom, the bite plate dividing the arch-shaped guard into an upper portion and a lower portion;
a first light array arranged along the lower portion of the arch-shaped guard and including a plurality of lights configured to direct light onto a plurality of the lower teeth, the first light array arranged a first offset distance from the bite plate; and
a second light array arranged along the upper portion of the arch-shaped guard and including a plurality of lights configured to direct light onto a plurality of the upper teeth, the second light array arranged a second offset distance from the bite plate, the second offset distance greater than the first offset distance.

2. The mouthpiece of claim 1, wherein the first light array includes at least ten lights configured to direct light onto at least ten lower teeth, and wherein the second light array includes at least ten lights configured to direct light onto at least ten upper teeth.

3. The mouthpiece of claim 1, wherein the bite plate includes an outer profile following the contour of the inner surface of the arch-shaped guard and an inner profile, and wherein a distance between the inner profile and the outer profile of the bite plate increases towards an end of the bite plate.

4. The mouthpiece of claim 3, wherein the bite plate extends a length along the inner surface of the arch-shaped guard corresponding to a distance between a first molar and a lateral incisor.

5. The mouthpiece of claim 1, wherein each of the plurality of lights of the first light array are located at an offset distance from the bite plate that corresponds to the average length of the plurality of lower teeth.

6. The mouthpiece of claim 1, wherein each of the plurality of lights in the second light array are located at an offset distance from the bite plate that corresponds to the average length of the plurality of upper teeth.

7. The mouthpiece of claim 1, wherein the lower portion of the arch-shaped guard extends a first length from the bite plate and the upper portion of the arch-shaped guard extends a second length from the bite plate, the second length being greater than the first length.

8. The mouthpiece of claim 7, wherein the plurality of lights in the first light array are arranged along a center of the upper portion, and wherein the plurality of lights in the second light array are arranged along a center of the lower portion.

9. The mouthpiece of claim 1, wherein the plurality of lights of the first light array and the plurality of lights of the second light array are embedded in the arch-shaped guard.

10. A mouthpiece for teeth whitening comprising:
an arch-shaped guard having an outer surface and an inner surface, the inner surface contoured to follow a shape of a dentition, the arch-shaped guard sized to span at least a portion of upper teeth and a portion of lower teeth in the dentition;
a bite plate positioned along the inner surface and extending substantially perpendicularly therefrom, the bite plate dividing the arch-shaped guard into an upper portion and a lower portion, the bite plate having an outer profile and an inner profile, the outer profile following the contour of the inner surface, wherein a distance between the inner profile and the outer profile increases towards an end of the bite plate;
a first light array arranged along the lower portion of the arch shaped guard for directing light onto a plurality of lower teeth, the first light array arranged a distance from the bite plate corresponding to a length of the plurality of lower teeth; and
a second light array arranged along the upper portion of the arch-shaped guard for directing light onto a plurality of upper teeth, the second light array arranged a distance from the bite plate corresponding to a length of the plurality of upper teeth.

11. The mouthpiece of claim 10, wherein the first light array includes at least ten lights arranged to direct light onto at least ten upper teeth and the second light array includes at least ten lights arranged to direct light onto at least ten lower teeth including at least two molars.

12. The mouthpiece of claim 10, wherein each light in the first light array is arranged along the lower portion of the arch-shaped guard an offset distance from the bite plate that corresponds with an average length of the plurality of lower teeth.

13. The mouthpiece of claim 10, wherein each light in the second light array is arranged along the upper portion of the arch-shaped guard an offset distance from the bite plate that corresponds with an average length of the plurality of upper teeth.

14. The mouthpiece of claim 10, wherein the lower portion of the arch-shaped guard extends a first length from the bite plate and the upper portion of the arch-shaped guard extends a second length from the bite plate, the second length being greater than the first length.

15. A mouthpiece for teeth whitening comprising:
an arch-shaped guard having an outer surface and an inner surface, the inner surface contoured to follow a shape of a dentition, the arch-shaped guard sized to span at least a portion of upper teeth and a portion of lower teeth in the dentition;
a bite plate positioned along the inner surface and extending substantially perpendicularly therefrom, the bite plate dividing the arch-shaped guard into an upper portion and a lower portion, the bite plate having an outer profile that follows the contour of the inner surface of the arch-shaped guard;
a first light array arranged along the lower portion of the arch-shaped guard for directing light onto a plurality of lower teeth, wherein each light in the first light array is arranged a distance from the bite plate corresponding to an average length of the plurality of lower teeth; and
a second light array arranged along the upper portion of the arch-shaped guard for directing light onto a plurality of upper teeth, wherein each light in the second light array is arranged a distance from the bite plate corresponding to an average length of the plurality of upper teeth.

16. The mouthpiece of claim 15, wherein the upper portion and the lower portion each extend a length from the bite plate that is the same.

17. The mouthpiece of claim 15, wherein the upper portion extends a first length from the bite plate and the lower portion extends a second length from the bite plate, the first length being greater than the second length.

18. The mouthpiece of claim 15, wherein the first light array includes at least ten lights arranged to direct light onto at least ten lower teeth.

19. The mouthpiece of claim 15, wherein the second light array includes at least ten lights arranged to direct light onto at least ten upper teeth.

20. The mouthpiece of claim 15, wherein the bite plate further includes an inner profile, and wherein a distance between the inner profile and the outer profile increases towards an end of the bite plate.

* * * * *

UNITED STATES PATENT AND TRADEMARK OFFICE
CERTIFICATE OF CORRECTION

| | | |
|---|---|---|
| PATENT NO. | : 10,716,652 B2 | Page 1 of 1 |
| APPLICATION NO. | : 16/100449 | |
| DATED | : July 21, 2020 | |
| INVENTOR(S) | : Russ Stewart et al. | |

It is certified that error appears in the above-identified patent and that said Letters Patent is hereby corrected as shown below:

On the Title Page

Item (73), please correct the name of the Assignee to read:
--SDC U.S. SmilePay SPV--

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*